US011085883B2

(12) United States Patent
Gut

(10) Patent No.: US 11,085,883 B2
(45) Date of Patent: Aug. 10, 2021

(54) FRAME FOR FASTENING INSPECTION MODULES FOR CONTAINERS AND INSPECTION DEVICE

(71) Applicant: Krones AG, Neutraubling (DE)

(72) Inventor: Thorsten Gut, Neutraubling (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 16/099,355

(22) PCT Filed: Jul. 10, 2018

(86) PCT No.: PCT/EP2018/068625
§ 371 (c)(1),
(2) Date: Nov. 6, 2018

(87) PCT Pub. No.: WO2019/029927
PCT Pub. Date: Feb. 14, 2019

(65) Prior Publication Data
US 2021/0088455 A1     Mar. 25, 2021

(30) Foreign Application Priority Data
Aug. 9, 2017    (DE) .................... 10 2017 213 880.7

(51) Int. Cl.
*G01N 21/90*     (2006.01)
*B65G 21/00*     (2006.01)
*B65G 21/20*     (2006.01)

(52) U.S. Cl.
CPC ......... *G01N 21/9009* (2013.01); *B65G 21/00* (2013.01); *B65G 21/20* (2013.01);
(Continued)

(58) Field of Classification Search
CPC ............... G01N 21/9009; B65G 21/00; B65G 2201/0244; B65G 2203/04;
(Continued)

(56) References Cited

U.S. PATENT DOCUMENTS

| 4,021,122 | A | * | 5/1977 | Krenmayr | ............... | B07C 5/126 |
|  |  |  |  |  |  | 356/239.4 |
| 4,230,219 | A | * | 10/1980 | Pezzin | .................... | B07C 5/122 |
|  |  |  |  |  |  | 198/346.2 |

(Continued)

FOREIGN PATENT DOCUMENTS

| CN | 102565086 A | 7/2012 |
| CN | 205958483 U | 2/2017 |

(Continued)

OTHER PUBLICATIONS

"Patent translate KR101287464B1" Google Translate. (Year: 2021).*

(Continued)

*Primary Examiner* — Mark A Deuble
(74) *Attorney, Agent, or Firm* — Lowenstein Sandler LLP

(57) ABSTRACT

The present disclosure relates to a frame for fastening inspection modules for containers. The frame includes a conveyor for the containers and a plurality of rails. The plurality of rails includes a first rail and a second rail arranged on a first side of the conveyor and a third rail and a fourth rail arranged on a second side of the conveyor. Each of the plurality of rails are for the fastening of the inspection modules. The present disclosure further relates to an inspection unit including the frame and at least one of the inspection modules.

18 Claims, 3 Drawing Sheets

(52) U.S. Cl.
CPC .. *B65G 21/2045* (2013.01); *B65G 2201/0244* (2013.01); *B65G 2203/04* (2013.01)

(58) Field of Classification Search
CPC ............... B65G 21/2072; B65G 21/20; B65G 21/2045; B65G 21/2054; B65G 21/2063
USPC .......................................... 198/339.1–346.3
See application file for complete search history.

(56) References Cited

U.S. PATENT DOCUMENTS

| | | | |
|---|---|---|---|
| 5,020,908 A | 6/1991 | Hermann | |
| 5,719,679 A * | 2/1998 | Shimizu | G01N 21/9027 356/428 |
| 6,199,679 B1 * | 3/2001 | Heuft | G01N 21/9036 198/415 |
| 6,510,751 B2 | 6/2003 | Giometti | |
| 6,943,877 B2 | 9/2005 | Diehr et al. | |
| 7,044,707 B2 | 5/2006 | Garin et al. | |
| 2012/0113248 A1 | 5/2012 | Fiegler | |
| 2014/0238820 A1 * | 8/2014 | Cavina | B65G 47/846 198/346.2 |
| 2016/0229636 A1 * | 8/2016 | Peters | B65G 15/62 |
| 2019/0276243 A1 * | 9/2019 | Levine | B65G 45/26 |

FOREIGN PATENT DOCUMENTS

| | | |
|---|---|---|
| DE | 101 57 920 A1 | 7/2002 |
| DE | 10 2011 001 127 | 9/2012 |
| DE | 10 2014 104078 A1 | 10/2015 |
| DE | 20 2017 002 042 U1 | 5/2017 |
| EP | 0 222 959 A1 | 5/1987 |
| EP | 0 415 154 A1 | 3/1991 |
| EP | 1 413 530 A1 | 4/2004 |
| EP | 1 493 502 A1 | 1/2005 |
| EP | 2 450 695 A1 | 5/2012 |
| GB | 2528934 A | 2/2016 |
| JP | 2007-278778 A | 10/2007 |
| KR | 101 287 464 B1 | 7/2013 |

OTHER PUBLICATIONS

Chinese Office Action dated Feb. 27, 2019, on application No. 201821278728.0.

International Search Report on application No. PCT/EP2018/068625, dated Oct. 9, 2018.

Office Action for Chinese Application No. 201880002114.6 dated Dec. 17, 2020, 20 pages.

* cited by examiner

FRAME FOR FASTENING INSPECTION MODULES FOR CONTAINERS AND INSPECTION DEVICE

RELATED APPLICATIONS

This application claims the benefit under 35 U.S.C. § 371 of International Patent Application No. PCT/EP2018/068625, filed Jul. 10, 2018, which claims the benefit of German Application No. 102017213880.7, filed Aug. 9, 2017, which are incorporated by reference in their entirety.

TECHNICAL FIELD

The present disclosure relates to a frame for fastening inspection modules for containers.

BACKGROUND

In the inspection of containers, in particular bottles, checks are carried out before use. Such checks are carried out in particular on returnable bottles which are reused. Typically, different properties of the containers are checked at several inspection stations.

Inspection modules are used for inspecting containers. These inspection modules are typically arranged on the conveyor or on a machine frame. In both cases, replacing modules or changing the assembly situation can involve a great deal of effort, as the conveyor or the machine must be switched off, for example, if modules are installed next to the conveyor/the machine or are fastened to the machine frame. In addition, the possible positions at which modules can be fastened are often predetermined or must be created by drilling, so that a displacement or modification of modules requires a high installation effort.

It is known from EP 2 450 695 that a device for inspecting containers is configured as an inspection unit with a carrier with receiving places for a plurality of inspection modules. Here, the receiving places are also fixedly predetermined.

BRIEF DESCRIPTION OF THE DRAWINGS

Embodiments of the present disclosure are illustrated by way of example, and not by way of limitation, in the figures of the accompanying drawings.

DETAILED DESCRIPTION

Figure 1:
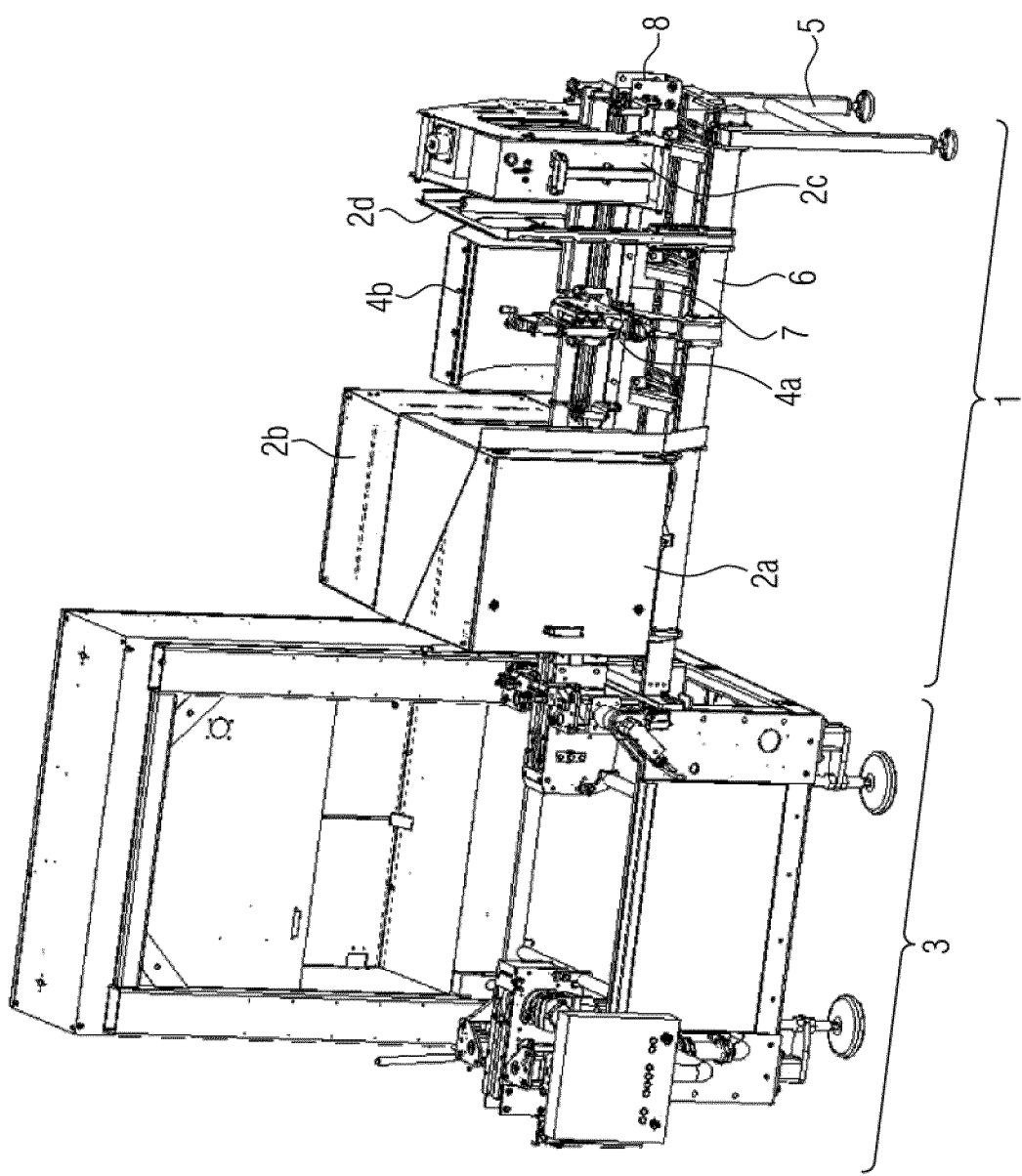
FIG. 1 shows an inspection unit including a frame and a plurality of inspection modules, according to certain embodiments.

The present disclosure provides a frame for fastening inspection modules for containers (e.g., bottles) and an inspection unit.

The containers can be bottles, for example. In some embodiments, containers can be recyclable bottles that have already been used once and are to be refilled.

The containers can be made of plastics such as polypropylene (PP), polyethylene (PE), polyethylene terephthalate (PET), polyethylene naphthalate (PEN), composites, metal or glass. They may be transparent and/or biodegradable.

Possible inspection modules for a frame according to the present disclosure can be, for example, modules for checking the tightness, checking the openings, checking for residues in the container, checking for impurities and the like. The inspection modules can include lighting devices, cameras and/or light barriers. Module parts, such as light barriers for detecting containers, high frequency (HF) sensors for detecting residual liquids, infrared (IR) and/or ultrasonic sensors, gamma or X-ray equipment and/or modules for detecting contamination in filled containers, can also be mounted individually on the frame.

According to the present disclosure, a frame for fastening inspection modules for containers includes a conveyor for containers. The conveyor may extend over the entire length of the frame. A first rail and a second rail are arranged on a first side of the conveyor and a third rail and a fourth rail are arranged on a second side of the conveyor for fastening inspection modules. The frame can, for example, be a tubular or square frame.

The conveyor can, for example, be configured as a conveyor belt, air conveyor, link chain conveyor or another conveyor known from the prior art. In some embodiments, the conveyor can be configured to convey containers in horizontal direction. The conveyor can include side surfaces that limit the movement in lateral direction (perpendicular to the direction of movement). The conveyor can be adapted to hold the containers along the ring (e.g., the conveyor or frame may have tubular side surfaces forming a ring).

To the right and left of the conveyor (indication of the direction in this text in relation to the direction of movement of containers conveyed by the conveyor) there are two rails each for fastening inspection modules.

These rails may be (substantially) arranged along the entire length of the conveyor. In some embodiments, (e.g., only) at the connecting points at the beginning and end of the conveyor, the lengths of the conveyor and one or more rails differ from one another. For example, one or more rails can project beyond the conveyor at one or both ends of the conveyor (i.e., can be longer than the conveyor). In another example, one or more rails can be shortened at the beginning and/or end of the conveyor compared to the conveyor (i.e., the conveyor projects beyond the rail length). In some embodiments, the connection of the frame to other components may be facilitated by the lengths of the conveyor and the one or more rails differing from each other.

The rails may not be arranged at the same height as the conveyor. For example, on each side of the conveyor one of the two rails can be arranged on a respective side at the height of the conveyor (or higher), so that the rail or rails are horizontally on the same level on which containers are also conveyed. The other rail on the side of the conveyor under consideration can be arranged offset downwards in vertical direction in relation to the transport plane of the containers and/or further away from the conveyor in horizontal direction. By arranging the one rail below the second rail, protruding inspection modules and/or fold-out inspection modules can be mounted or folded out to rest on the second rail. In some embodiments, the two rails to the right of the conveyor and the two rails to the left of the conveyor are arranged symmetrically (e.g., axis-symmetrically) with respect to the conveyor.

The rails are configured such that inspection modules can be fastened to them. The rails may be configured to carry the weight of inspection modules alone, so that no further fastening or installation (e.g. on the floor) of the inspection modules is necessary. The two rails on one side of the conveyor can have different cross-sections and thicknesses. For example, a rail arranged closer to the conveyor may have a smaller height and/or diameter (e.g., and thus smaller material thickness) than a rail arranged further away from the conveyor.

In some embodiments, the frame can be configured such that the inspection modules are fully held by the frame. This eliminates the need to install inspection modules on the floor and/or further installation of inspection modules on frames or components of other machines used in the system.

The rails can be arranged in such a way that inspection modules can be fastened continuously (i.e., they can be continuously displaced in the direction of transport or against the transport direction of the containers). Hence, in a frame according to the present disclosure, fixed slots for mounting action modules may not be provided. In some embodiments, the inspection modules (and other components, e.g., discharge units, railings, etc.) can be fastened flexibly and variably along the rail. In some embodiments, with a continuous fastening option, there are no fixed places for mounting the inspection modules or other components.

In some embodiments, the rails can be configured in such a way that the inspection modules (and other components) can be fastened in a form-fit manner (e.g., via clamps) to one or more of the rails. In some embodiments, the fastening for an inspection module includes at least two clamps. In some embodiments, the fastening for the inspection module includes more than two clamps. The clamps may be fastened to the inspection module and can be fastened to one or two rails arranged on one side of the conveyor. Some inspection modules can also be fastened to one or more rails on both sides of the conveyor.

In some embodiments, a clamp for an inspection module can be configured in such a way that it is of a multi-part configuration. For example, the clamp may here be of a three-part configuration and include a first part (e.g., optionally fixedly) connected to the inspection module and adapted to be arranged above or below a rail and to enclose it from above or below (e.g., and optionally from at least one side). The clamp may include a second movable part which is adapted to enclose the rail from below or above (from below if the first part encloses the rail from above; from above, if the first part encloses the rail from below) and to fasten it, for example by a screw (third part). This allows the inspection module to be fastened to the rails by fastening the movable parts of such clamps. Such a fastening may be carried out quite quickly. Furthermore, the clamps (e.g., the first part of the clamps) can be arranged on inspection modules in advance in such a way that no further adjustment of the inspection modules is necessary after fastening by the clamps, thus also reducing the changing times. The first parts of the clamps can be permanently mounted on the inspection modules (e.g., by a plurality of screws, rivets, welds or similar). The clamps or at least the first part of the clamps can also be an integral part of the unit to be fastened.

The rails for fastening inspection modules can be arranged in such a way that, after installation of the inspection modules, the rails are still spaced from the conveyor, i.e., the clamps are spaced from the conveyor (e.g., in case of fastening by clamps). Such a configuration of the rails can prevent an accumulation of germs on the contact surfaces (e.g., by liquid residues or dirt remaining on the contact surfaces).

A frame according to the present disclosure can have two or more feet. In some embodiments, these feet can be fastened in a form-fit manner (for example by a clamp) to one of the rails (e.g., to the rail located further away from the conveyor). Hence, the feet can be arranged to be also displaceable. Moreover, the feet can be individually height-adjustable so that differences in height of the floor can be compensated.

Furthermore, the frame can be configured at its ends (beginning and end of the conveyor) such that the frame includes a connection configuration to which further container handling machines, conveyors or machines or components can be connected for container treatment. In some embodiments, the frame is configured such that it can be connected at one end to a basic machine for inspection and/or hooked into a receptacle (for example, via a standardized connection configuration in this direction), and at the other end a further conveyor or other component is connectable. The frame can thereby be connected modularly to one or more other machines. For example, the frame can be configured such that the frame is connectable or is connected at one end to a basic machine, whereby, in the connected state, the machine may carry the weight of the frame on this side along the transport direction. At the other end (in relation to the transport direction of containers) the frame can be configured in such a way that the frame includes two feet with which the frame stands stable, so that the frame does not require any further support from another machine. The feet can be mounted alternatively or additionally at any place (and in any number). For example, the frame may include two or more feet, for example four, where for example two can be mounted at the end of the frame and two in the area between the beginning and end of the frame, e.g. in the middle of the frame (in the transport direction/against the transport direction of the containers).

A frame according to the present disclosure can include one, two or more cable ducts. The cable ducts can be fastened to the frame and can be removable. In some embodiments, one or two cable ducts extend along the transport direction of the conveyor. In some embodiments, the cables may be guided along the entire length of the frame. The cable ducts can, for example, be arranged to the right and left next to the conveyor and/or below the transport level of the containers. If two cable ducts are arranged along the transport direction of the conveyor, a first cable duct may be arranged to the right of the conveyor and a second cable duct may be arranged to the left of the conveyor. The first cable duct may be provided for receiving cables for power and the second cable duct may be provided for receiving cables for control.

In some embodiments, the frame for fastening inspection modules for containers also includes cross-connections for cables, so that the cables can also be guided from right to left and vice versa according to the transport direction. In some embodiments, inspection modules may be arranged on the right and left. Such cross-connections may be used responsive to the frame including two cable ducts extending along the transport direction, one of which is arranged on the right and one on the left with respect to the transport direction of containers. In this case, it is possible with such cross-connections to guide cables from any parts to which inspection modules can be fastened to any other place of the frame (and thus to any inspection module). The cross-connections can be arranged to be displaceable along the transport direction of the containers and can optionally be removable.

The cable ducts and/or the cross-connections between the cable ducts can be configured to be downwardly liquid-permeable. For example, the cable ducts and/or the cross-connections between the cable ducts may be configured as small wire baskets or racks or include small wire baskets or racks. In some embodiments, cable ducts can be opened downwards. For example, the lower part of the cable duct that includes the small basket can be folded out, for example up to a stop, the cables can be inserted and the whole structure can then be closed again. This allows cables to be laid easily, especially since they can be laid down and then, when all cables have been laid, the cable duct can be closed. For example, the cable duct can be opened downwards in that a lock is released on one side and the cable duct is folded downwards with respect to a fastening on a second side. After a rotation of between 30° and 60°, e.g. about 45°, the cable duct can reach a stop so that cables can be inserted and do not fall out. The cable duct can then be closed again.

The cable ducts and/or the cross-connections can be covered from above, e.g. by sheets which can optionally extend obliquely to the horizontal, so that liquid is led away. This is typically advantageous if liquids are or can be transported in the containers to prevent the ingress of liquids from above. The covers may be mountable for individual areas and/or (e.g., continuously) displaceable along the rail(s).

The covers can also be integrated in the individual inspection modules or in a discharge unit, for example below an ejection chute for the discharge of bottles. For example, in an area in which an inspection module or discharge unit is fastened, the cable ducts and/or cross-connections can be covered from above by the covers integrated in the inspection modules or discharge unit(s) and in other areas optionally by the covers that can be mounted for individual areas.

In some embodiments, the frame can also include a drip tray, which may be arranged below the conveyor. In some embodiments, the drip tray is made of an easily cleanable material or has an easily cleanable surface. A drip tray may have a raised edge on the right and left (in relation to the transport direction of the containers) and a smooth surface in between (e.g., made of stainless steel) and may be adapted to collect and drain liquid that may drip from containers. For this purpose, the drip tray may be slightly inclined in transport direction to one of the two ends of the conveyor (for example between 0.5° and 5°, for example between 1° and 2°). The inclination can be adjustable, for example via suitable holders.

In some embodiments, the drip tray has a width (e.g. a width between the edges) that is as wide as or wider than the conveyor, so that any liquid dripping down from the conveyor can be collected. However, the drip tray may also be narrower in other embodiments.

The frame may also include a railing which may prevent external access to the inspection modules and/or the frame and/or the conveyor during operation. The railing may be configured such that the railing can be fastened to a rail for fastening inspection modules (e.g., the rail closer to the conveyor). Like the inspection modules, the railing can be fastened in a form-fit manner, e.g. by clamps, and/or can be (continuously) displaceable along the rail(s).

The frame may also include a cover which is adapted to cover the areas of the frame not occupied by inspection modules. This cover can be configured to be oblique, for example made of sheet metal, and inclined away from the conveyor. The cover may be (continuously) displaceable and/or removable along the rails and/or can be mounted for individual areas. The cover can be fastened to one or more rails, for example to the rail closer to the conveyor.

The frame may also include a cover above the bottles which is adapted to prevent downwardly falling dirt or liquids from contaminating the bottles from above. The mounting of the cover may be configured such that the cover can be fastened to a rail for fastening inspection modules (e.g., the rail located closer to the conveyor). This cover can also be (continuously) displaceable and removable and/or can be mounted for individual areas.

The frame may also include a mounting for a guard which is adapted to keep the operator away from the inspection modules and/or the bottle flow during operation, depending on the requirements. For example, the guard can be configured as a splash guard and/or as a tamper guard during a mechanical or electrical adjustment of the inspection modules.

The cover above the bottles can be configured as the same cover as the cover which is adapted to cover the areas of the frame not occupied by inspection modules. In other embodiments, in some areas the cover above the bottles may be configured as the same cover as the cover that is adapted to cover the areas of the frame not occupied by inspection modules and may be configured as a different cover in other areas.

For example, in areas where one or more inspection modules are mounted, a cover above the bottles may be formed by a cover of the inspection module. In some embodiments, in other areas a cover above the bottles may be formed by another cover, for example a cover that is adapted to cover the areas of the frame not occupied by inspection modules.

The frame may include one, two or more discharge units (discharge modules), which can, for example, discharge containers considered defective. Such discharge units may also include means for the form-fit fastening to one or more rails (e.g., clamps as described above). A discharge unit can include an ejection chute for discharging bottles. For example, a discharge unit can be fastened to the frame on both sides of the conveyor.

The present disclosure also includes an inspection unit including a frame for fastening inspection modules for containers as described above, and one, two or more inspection modules. One, two or more of the inspection modules may be inspection modules as described above and may include devices for fastening the inspection modules to the frame (e.g., clamps described above). An inspection unit may include one or more or all of the following inspection modules: one or more lamps, one or more mirror cabinets, one or more cameras, one or more pushers, one or more light barriers, one or more reflectors with respect to the light barriers, inspection modules for checking the side walls of containers, inspection modules for checking the bottom of containers, inspection modules for checking the container mouth or the like.

Furthermore, the inspection unit can also include additional peripheral devices with previously described devices for fastening to the frame (e.g., previously described clamps). Such peripheral devices may include, for example, one or more of the following devices: electrical distribution units, operating buttons for controlling the machine, boxes for test equipment, tools, cleaning utensils or the like.

Moreover, an inspection unit can include a basic machine for inspecting containers.

Embodiments of the present disclosure are described with reference to the following figures. The figures may not be true to scale. One or more of the details shown in the figures can each be included in a frame according to the present disclosure individually or in any combinations.

FIG. 1 illustrates an inspection unit, according to certain embodiments. The inspection unit includes a frame 1 for fastening inspection modules. The frame 1 shown includes feet 5 and rails 6 and 7 arranged on the right and left of the conveyor 8 (rails 6 and 7 are only visible on one side of the conveyor). Inspection modules, here by way of example inspection modules 2a to 2d, can be fastened to the rails 6, 7. The inspection unit 2c is fastened by way of example on the right and left of the conveyor to the rails of the frame (e.g., the one side to rail 7 and the opposite side of the unit to the corresponding (invisible) rail 7 on the other side of the conveyor). In FIG. 1, the inspection unit also includes a basic machine 3 for inspecting containers which is connected to the frame 1 at the one end of the conveyor 8. The inspection unit may also include a discharge unit with the components 4a and 4b.

Figure 2:
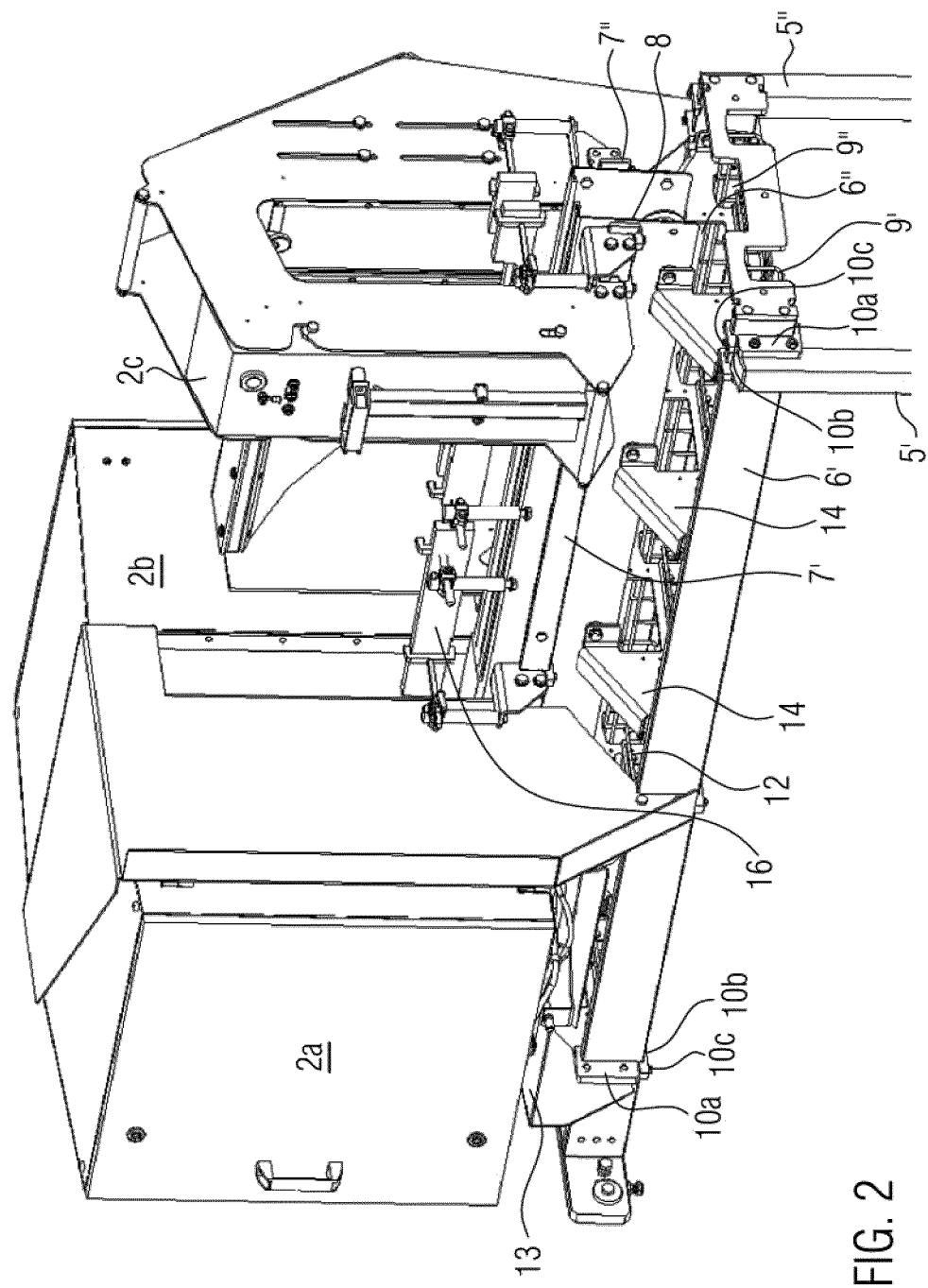
FIG. 2 shows a frame, according to certain embodiments.

FIG. 2 illustrates a frame for fastening inspection modules from the side, according to certain embodiments. An inspection unit with the elements 2a and 2b is fastened by way of example to the frame on both sides of the conveyor 8. (Components on different sides of the conveyor can—if appropriate—be designated in the following by the same numbers, but to distinguish the side of the conveyor on which they are mounted, the side can be indicated by indicating the number with dash (e.g., 6') or double dash (e.g. 6") for the other side). In this case, the fastening is made by form-fit connection with the rails, visible here on rails 6', 7' and 7", in this case for example via a clamp with the parts 10a, 10b and 10c. As in the example shown, such clamps may have a first part 10a connected to the inspection module (or another module or component to be mounted), and a second movable part 10b that can be fastened by a fastener 10c, such as a screw, so that the inspection module is fastened in a form-fit manner to the rail. In the example shown, the fixed part 10a is arranged on the rails (here visible on rails 7', 7" and 6') in such a way that it encloses the rail from above and (at least one part) laterally, while the second movable part 10b encloses the rail from below. The clamp can then be fastened by a third part 10c, for example a screw.

In some embodiments, a clamp may be used in components and inspection modules arranged above the rails, the fixed part 10a of said clamp enclosing the rails from above and laterally, with the movable part 10b being mounted from below. Another arrangement, in which the fixed part of the clamp encloses the rail from below and laterally, is however also possible. Other embodiments of clamps are also possible in this and other examples of the present disclosure. For example, the clamp may include the first two parts 10a, 10b and be fastened otherwise, or the movable part 10b may be of a different and/or multi-part configuration and/or a clamp may be of a two-part configuration and include only a fixed part 10a and a movable part 10b.

Feet 5' and 5" are also illustrated by way of example in FIG. 2. In this example, the feet 5' and 5" are also fastened in a form-fit manner by clamps. However, the clamps are illustrated by way of example in such a manner that the fixed part of the clamp 10a (which is connected to the feet) encloses the rails (visible on rail 6') from below and laterally, and the movable part 10b can be fastened from above using a fastener 10c, for example a screw. The clamps may be arranged in this manner so that the weight of the frame is transferred to the feet. In some embodiments, the fixed part of the clamp can be fastened to the feet in advance and permanently, e.g. by screws, welds, etc. In some embodiments, a different arrangement of the clamp, in which the fixed part encloses the rail from above and laterally and the movable part is mounted from below, is also possible.

Also illustrated are two exemplary cable ducts 9', 9", which can be mounted on the frame.

In some embodiments, in areas where no inspection modules are arranged on the frame, the frame can be covered by a cover 13 (e.g., an inclined cover 13) which can be arranged on the supports 14 and optionally fastened to the rail 7' and/or 6'. A corresponding cover may be mounted on the other side of the conveyor 8 on one or both rails 6" and/or 7".

In areas where inspection modules are available and in areas where no inspection modules are arranged on the frame, an optional additional railing 16 can be fastened to the frame to shield the frame and/or the inspection modules and/or the conveyor from the outside. The railing 16 can also be arranged on rail 7' and/or rail 6' (or on the other side on rail 6" and/or 7"). The railing 16 can be fastened in a form-fit manner, e.g. via clamps, where in the case of clamps, the fixed part is mounted such that it encloses the rail from above and laterally.

Figure 3:
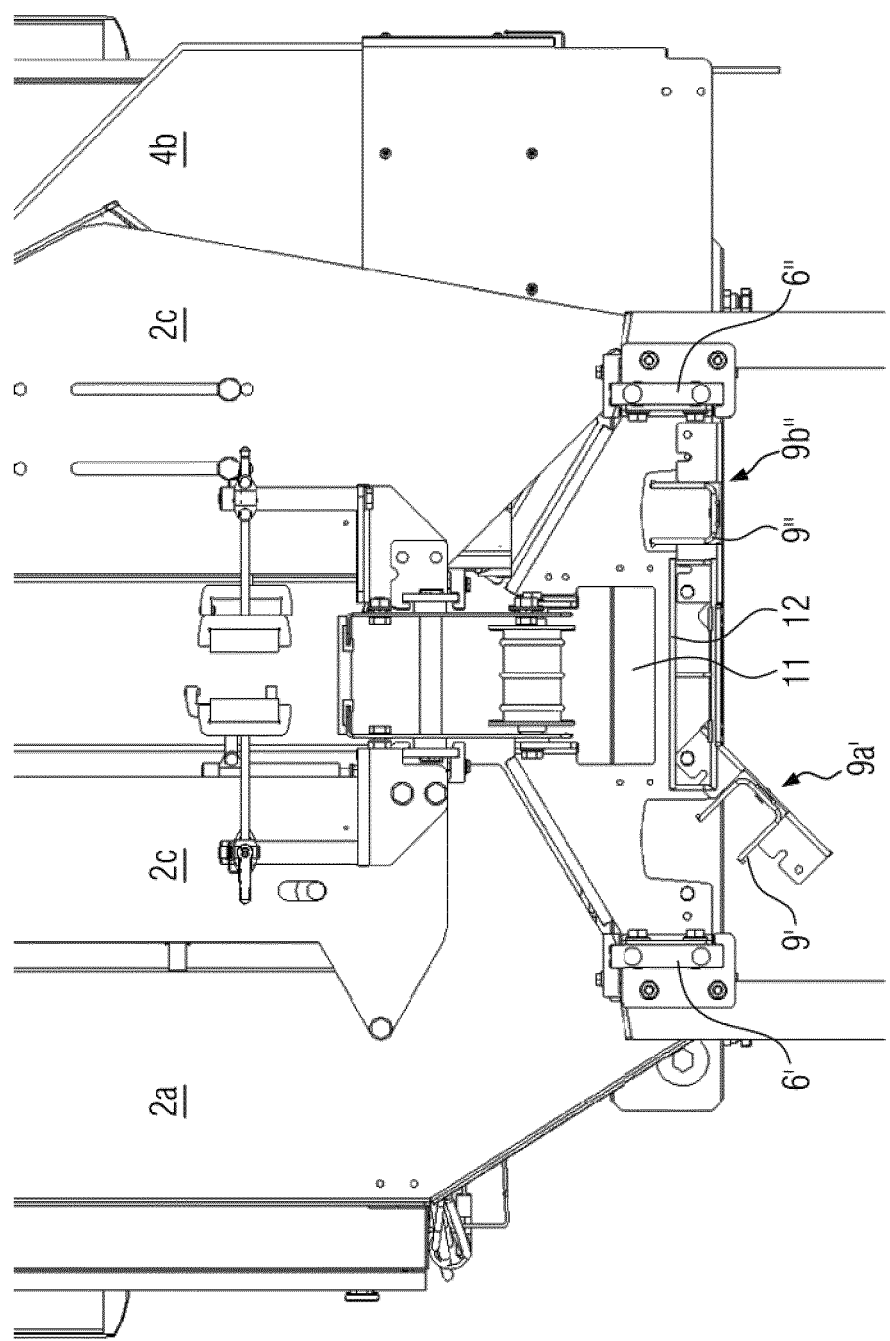
FIG. 3 shows an inspection unit in cross section, according to certain embodiments.

FIG. 3 illustrates a cross-sectional view of an inspection unit, according to certain embodiments. The feet 5' and 5" are illustrated by way of example, which feet are fastened in a form-fit manner by way of example via clamps with the parts 10a, 10b and 10c to rails 6', 6".

Also illustrated by way of example is an inspection module with the components 2a and 2b, which is fastened in a form-fit manner on both sides of the conveyor 8 to the rails 7', 7" by clamps with the components 10a, 10b, 10c.

In FIG. 3, optional cable ducts 9', 9" are also illustrated, which extend along the conveyor 8, as well as cross-connections for the cable ducts 12 (only one cross-connection is illustrated as an example). The cable duct 9' is illustrated as an example in the open position 9'a, the cable duct 9" in the closed position 9"b. In the open position, the cable ducts may be folded out downwards up to a stop, for example at about 45°, so that cables can then be laid in the cable ducts and the cable ducts can subsequently be closed again. The stop prevents cable ducts from opening further and cables, which have already been laid, from falling out during opening. In some embodiments, the cable ducts can be opened such that the opening into which cables can be laid points away from the conveyor. This makes it easier to lay the cables, as the opening may then be easier to access.

The cable ducts can be configured to be liquid-permeable downwards, for example as small wire baskets or wire racks. In some embodiments, the cable ducts are sealed upwards against liquid (not visible in this figure).

In the example shown, the cross-connections 12 can allow cables to be laid from the one side of the conveyor to the other side of the conveyor. There may also be more or less cross-connections for cable ducts. By configuring the cable ducts as wire frames or small wire baskets, cables can be branched off from the cable shafts 9', 9" and laid through the cross-connections. With an optional cross-connection, which extends between the cable ducts and over the entire width of the frame and can serve, for example, to connect the module frame to external power sources and/or measuring devices, the cables in the cable ducts 9', 9" can be powered or the corresponding signals can be routed away from the frame. According to the present disclosure, there may also be more than one such cross-connection, which extends over the entire width of the frame. Alternatively, the power supply or the routing of signals away from the frame can also be made possible by connection to one end of the frame.

Also illustrated by way of example is a drip tray 11, which is arranged under the conveyor 8 in such a way that the drip tray 11 can collect and accompany liquid. Such a drip tray can have an inclination (e.g. once adjustable or adjustable) in relation to the horizontal to discharge the liquid, for example between 1° and 2°, that may be in the direction of the transport movement of containers in the conveyor.

In some embodiments, the entire frame is configured such that under normal production condition, i.e. with grid ducts 9' and 9" folded in, the lower rails 6' and 6" form the lower end of the inspection module (with the exception of the feet 5). This increases production reliability and cleanability, because no elements protrude below and, due to, for example, a mobile container placed under the inspection module for collecting discharged containers, no damage to the cabling and/or drip plates can occur when removing or inserting the container.

These lower rails 6' and 6" can also be used to transport the inspection module by e.g. picking up/lifting with forklift with and without additional carriers. In some embodiments, an auxiliary rack may not be used.

It is to be understood that the above description is intended to be illustrative, and not restrictive. Many other embodiments will be apparent upon reading and understanding the above description. Although embodiments of the present disclosure have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A frame for fastening inspection modules for containers, the frame comprising:
    a conveyor for the containers; and
    a plurality of rails comprising:
        a first rail and a second rail arranged on a first side of the conveyor; and
        a third rail and a fourth rail arranged on a second side of the conveyor,
    wherein each of the plurality of rails are for the fastening of the inspection modules, wherein the inspection modules are to be fastened continuously to one or more of the of the plurality of rails, and wherein the inspection modules are to be displaced in a direction of transport of the containers or against the direction of transport of the containers.

2. The frame of claim 1, wherein the inspection modules are completely held by the frame.

3. The frame of claim 1, wherein the inspection modules are to be fastened to the plurality of rails via clamps.

4. The frame of claim 1, wherein the plurality of rails for the fastening of the inspection modules are arranged such that the inspection modules are spaced from the conveyor.

5. The frame of claim 1, wherein the frame comprises two or more feet.

6. The frame of claim 1, wherein the frame further comprises one or more cable ducts.

7. The frame of claim 6, wherein cross-connections are disposed between a first cable duct and a second cable duct of the one or more cable ducts.

8. The frame of claim 7, wherein at least one of the one or more cable ducts or the cross-connections are configured to be liquid-permeable downwards.

9. The frame of claim 7, wherein at least one of the one or more cable ducts or the cross-connections are covered from above.

10. The frame of claim 7, wherein at least one of the one or more cable ducts or the cross-connections are configured to be liquid-permeable downwards as wire racks.

11. The frame of claim 1, wherein the frame further comprises a drip tray arranged below the conveyor.

12. The frame of claim 1, wherein the frame further comprises one or more of a railing or a cover.

13. The frame of claim 1, wherein the frame further comprises a discharge unit.

14. The frame of claim 1, wherein the containers comprise one or more bottles.

15. An inspection unit comprising:
    a frame for fastening inspection modules for containers, the frame comprising:
        a conveyor for the containers; and
        a plurality of rails comprising:
            a first rail and a second rail arranged on a first side of the conveyor; and
            a third rail and a fourth rail arranged on a second side of the conveyor, wherein each of the plurality of rails are for the fastening of the inspection modules; and
    at least one of the inspection modules, wherein the inspection modules are to be fastened continuously to one or more of the of the plurality of rails, and wherein the inspection modules are to be displaced in a direction of transport of the containers or against the direction of transport of the containers.

16. The inspection unit of claim 15, wherein the plurality of rails for the fastening of the inspection modules are arranged such that the inspection modules are spaced from the conveyor.

17. The inspection unit of claim 15, wherein:
    the frame further comprises one or more cable ducts;
    cross-connections are disposed between a first cable duct and a second cable duct of the one or more cable ducts; and
    at least one of the one or more cable ducts or the cross-connections are configured to be liquid-permeable downwards and covered from above.

18. The inspection unit of claim 15, wherein the frame further comprises one or more of:
    two or more feet;
    a drip tray arranged below the conveyor;
    a railing;
    a cover; or
    a discharge unit.

* * * * *